United States Patent
von Beck

(10) Patent No.: US 8,136,486 B2
(45) Date of Patent: Mar. 20, 2012

(54) MOTORIZED VEHICLES SPARK TIMING CONTROL FOR USE WITH BIOFUEL GASOLINE MIXTURE

(76) Inventor: Paul Gerhard von Beck, Issaquah, WA (US)

( * ) Notice: Subject to any disclaimer, the term of this patent is extended or adjusted under 35 U.S.C. 154(b) by 507 days.

(21) Appl. No.: 12/258,841

(22) Filed: Oct. 27, 2008

(65) Prior Publication Data

US 2011/0046865 A1 Feb. 24, 2011

Related U.S. Application Data

(60) Provisional application No. 60/984,237, filed on Oct. 31, 2007.

(51) Int. Cl.
  *F02B 43/00* (2006.01)
  *F02B 13/00* (2006.01)
  *F02P 3/04* (2006.01)
(52) U.S. Cl. .................. 123/1 A; 123/575; 123/595
(58) Field of Classification Search .................. 123/1 A, 123/305, 575, 625, 626, 595, 640
See application file for complete search history.

(56) References Cited

U.S. PATENT DOCUMENTS

| | | | | |
|---|---|---|---|---|
| 4,922,862 | A * | 5/1990 | Casacci | 123/406.47 |
| 4,955,345 | A * | 9/1990 | Brown et al. | 123/381 |
| 4,974,552 | A * | 12/1990 | Sickafus | 123/1 A |
| 4,995,367 | A * | 2/1991 | Yamauchi et al. | 123/494 |
| 5,092,305 | A * | 3/1992 | King | 123/575 |
| 5,139,002 | A * | 8/1992 | Lynch et al. | 123/575 |
| 5,697,346 | A * | 12/1997 | Beck | 123/494 |
| 5,735,245 | A * | 4/1998 | Kubesh et al. | 123/406.55 |
| 7,305,939 | B2 * | 12/2007 | Carlson | 123/27 GE |
| 7,349,790 | B2 * | 3/2008 | Sremac et al. | 701/104 |
| 7,404,397 | B2 * | 7/2008 | Dobeck | 123/672 |
| 7,431,024 | B2 * | 10/2008 | Buchwitz et al. | 123/575 |
| 2005/0273246 | A1 * | 12/2005 | Griese | 701/113 |
| 2006/0236976 | A1 * | 10/2006 | Carlson | 123/406.47 |
| 2008/0091334 | A1 * | 4/2008 | Carlson et al. | 701/105 |
| 2010/0326410 | A1 * | 12/2010 | Yeh et al. | 123/575 |

* cited by examiner

*Primary Examiner* — Thomas Moulis
(74) *Attorney, Agent, or Firm* — Michael I. Kroll

(57) ABSTRACT

The present invention provides apparatus for varying an engine's combustion spark timing for use of hybrid fuels, such as bio-fuel and gasoline. An operator selectable switch enables or disables an on-board computer selecting between gasoline and bio-fuel mixtures as the on-board fuel so that engine mounted sensors provide data used to determine optimum fuel-ignition spark discharge values from a computerized table.

9 Claims, 9 Drawing Sheets

22

```
┌─────────────────────────────┐
│ METHODS FOR ACHIEVING OPTIMAL│
│IGNITION TIMING TO ACCOMMODATE BIO│
│  DIESEL / GAS BLENDS FOR USE IN │
│       GASOLINE ENGINES      │
└─────────────────────────────┘
              │
              ├──────┌─────────────────────────┐
              │      │ FUEL KNOCK DETECTOR FOR │
              │      │   INTERNAL-COMBUSTION   │
              │      │        ENGINES          │
              │      └─────────────────────────┘
              │
              └──────┌─────────────────────────┐
                     │ UNICHIP COMPUTER MODULE │
                     └─────────────────────────┘
```

FIG. 3

ALTERNATIVE FUEL TEST LOG (ADDITIONAL IGNITION ADVANCE 10° BIO DIESEL WITH 87 OCTANE GASOLINE)

| | | 1000 RPM | 2000 RPM | 3000 RPM | 4000 RPM | 5000 RPM | 6000 RPM |
|---|---|---|---|---|---|---|---|
| | WOT | 5 | 5 | 5 | 5 | 5 | 5 |
| | 13 | 5 | 5 | 5 | 5 | 5 | 5 |
| | 12 | 5 | 5 | 5 | 5 | 5 | 5 |
| | 11 | 5 | 5 | 5 | 5 | 5 | 5 |
| | 10 | 5 | 5 | 5 | 5 | 5 | 5 |
| | 9 | 5 | 5 | 5 | 5 | 5 | 5 |
| | 8 | 5 | 5 | 5 | 5 | 5 | 5 |
| LOAD | 7 | 5 | 5 | 5 | 5 | 5 | 5 |
| | 6 | 5 | 5 | 5 | 5 | 5 | 5 |
| | 5 | 5 | 5 | 5 | 5 | 5 | 5 |
| | 4 | 5 | 5 | 5 | 5 | 5 | 5 |
| | 3 | 5 | 5 | 5 | 5 | 5 | 5 |
| | 2 | 5 | 5 | 5 | 5 | 5 | 5 |
| | 1 | 5 | 5 | 5 | 5 | 5 | 5 |

OBSERVED CHARACTERISTICS

A) NO CHANGE IN PERFORMANCE
B) MINOR SMOKE ON INITIAL START UP
C) NORMAL FUEL ECOMONY AT 18.9 MPG

FIG. 8

ALTERNATIVE FUEL TEST LOG (ADDITIONAL IGNITION ADVANCE 50° BIO DIESEL WITH 87 OCTANE GASOLINE)

| LOAD | | 1000 RPM | 2000 RPM | 3000 RPM | 4000 RPM | 5000 RPM | 6000 RPM |
|---|---|---|---|---|---|---|---|
| | WOT | 10 | 8 | 6 | 6 | 7 | 9 |
| | 13 | 10 | 8 | 6 | 6 | 7 | 9 |
| | 12 | 10 | 8 | 6 | 7 | 8 | 9 |
| | 11 | 10 | 8 | 6 | 8 | 8 | 9 |
| | 10 | 10 | 8 | 6 | 8 | 9 | 9 |
| | 9 | 10 | 8 | 6 | 8 | 10 | 10 |
| | 8 | 10 | 8 | 6 | 9 | 11 | 10 |
| | 7 | 10 | 9 | 8 | 9 | 12 | 13 |
| | 6 | 12 | 9 | 8 | 10 | 12 | 13 |
| | 5 | 12 | 10 | 9 | 10 | 13 | 14 |
| | 4 | 14 | 10 | 9 | 11 | 13 | 14 |
| | 3 | 14 | 12 | 10 | 11 | 13 | 14 |
| | 2 | 14 | 12 | 10 | 12 | 13 | 14 |
| | 1 | 14 | 12 | 11 | 12 | 13 | 14 |

OBSERVED CHARACTERISTICS

A) CONSIDERABLE GRAY SMOKE
B) VERY SLUGGISH COLD PERFORMANCE - AFTER 10 MINUTES DRIVABLE
C) FUEL ECOMONY AT 12 MPG (PRIMARILY DUE TO SHORT TRIPS & NOT ALLOWING 10 MINUTE WARMUP)

FIG. 9

MOTORIZED VEHICLES SPARK TIMING CONTROL FOR USE WITH BIOFUEL GASOLINE MIXTURE

RELATED APPLICATIONS

This application is subject to U.S. provisional application Ser. No. 60/984,237 filed 31 Oct. 2007.

Please incorporate by reference all information in said provisional application into this instant application.

BACKGROUND OF THE INVENTION

Field of the Invention

The present invention relates generally to motor vehicles and, more specifically, to varying vehicle's engine spark timing during use of a bio-fuel gasoline fuel mixture.

The present invention provides apparatus for varying an engine's combustion spark timing during use of hybrid fuels, such as bio-fuel and gasoline. Also provided is selectable switch means for engaging an on-board computer when a bio-fuel gasoline fuel mixture is used as a fuel source with the computer in sensor communication to establish parametric values used to perform a computer database lookup to determine the optimum spark timing for a bio-fuel gasoline fuel mixture.

The present invention provides that the timing apparatus can be used in all gasoline engines.

SUMMARY OF THE PRESENT INVENTION

A primary object of the present invention is to provide apparatus for varying motorized vehicles engine spark timing.

Another object of the present invention is to provide apparatus for automatically varying an engine's spark timing for use of a bio-fuel gasoline mixture as a fuel source.

Yet another object of the present invention is to provide apparatus whereby a motor vehicle can operate on gasoline or hybrid fuels Still yet another object of the present invention is to provide switch apparatus for engaging a computerized database of predetermined values to determine the optimum combustion chamber spark timing for a given bio-fuel gasoline mixture.

Another object of the present invention is to provide apparatus having a plurality of varying sensor apparatus for establishing parametric variables to perform a database lookup to obtain the optimum spark timing for a given fuel mixture at a given load for a given engine state.

Additional objects of the present invention will appear as the description proceeds.

The present invention overcomes the shortcomings of the prior art by providing apparatus for varying an engine's combustion spark timing during use of hybrid fuels, such as bio-fuel and gasoline. Also provided is selectable switch means for engaging an on-board computer when a bio-fuel gasoline fuel mixture is used as a fuel source with the computer in sensor communication to establish parametric values used to perform a computer database lookup to determine the optimum spark timing for a bio-fuel gasoline fuel mixture used in any type of gasoline engine.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 3 is a block diagram of the present invention's methods of achieving optimal ignition timing.

FIG. 8 is an a chart of the alternative fuel test log

FIG. 9 is a chart of the alternative fuel test log.

DESCRIPTION OF THE REFERENCED NUMERALS

Figure 1:
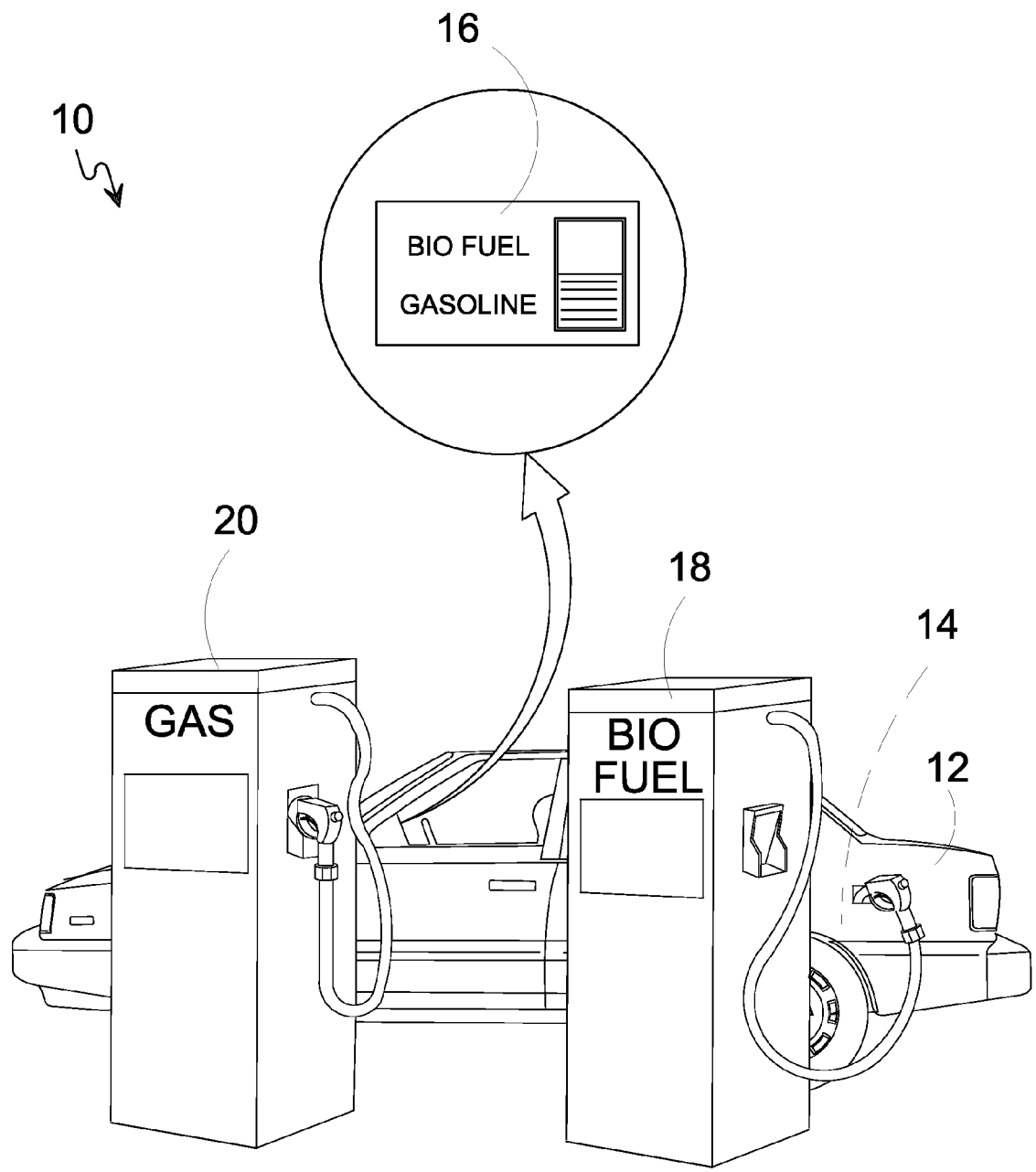
FIG. 1 is an illustrative view of the present invention in use.

Turning now descriptively to the drawings, in which similar reference characters denote similar elements throughout the several views, the figures illustrate the timing apparatus of the present invention. With regard to the reference numerals used, the following numbering is used throughout the various drawing figures.

10 timing apparatus for controlling fuel-ignition spark discharge
12 vehicle
14 fuel tank
16 switch
18 bio-fuel
20 gasoline
22 testing device
24 chart
26 vehicle states
28 vehicle start up
30 vehicle warm up
32 vehicle cruise
34 vehicle shut down
36 vehicle control system
38 engine control unit
40 computer
42 sensors
44 engine state feedback
46 testing device
48 temperature sensor
50 humidity sensor 52 pressure sensor
54 exhaust product sensor
56 testing procedure chart
58 operational procedure chart
60 operational flow chart

DETAILED DESCRIPTION OF THE PREFERRED EMBODIMENT

The following discussion describes in detail one embodiment of the invention (and variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the present invention in use. The present invention 10 is a method and apparatus to optimize ignition timing via switch 16 to accommodate bio diesel 18/gas 20 blends for use in gasoline engines, such as vehicle 12 having tank 14. The method and system provides means to efficiently run a gasoline engine utilizing bio diesel/gasoline blends varying from 50% to 0% bio diesel.

Figure 2:
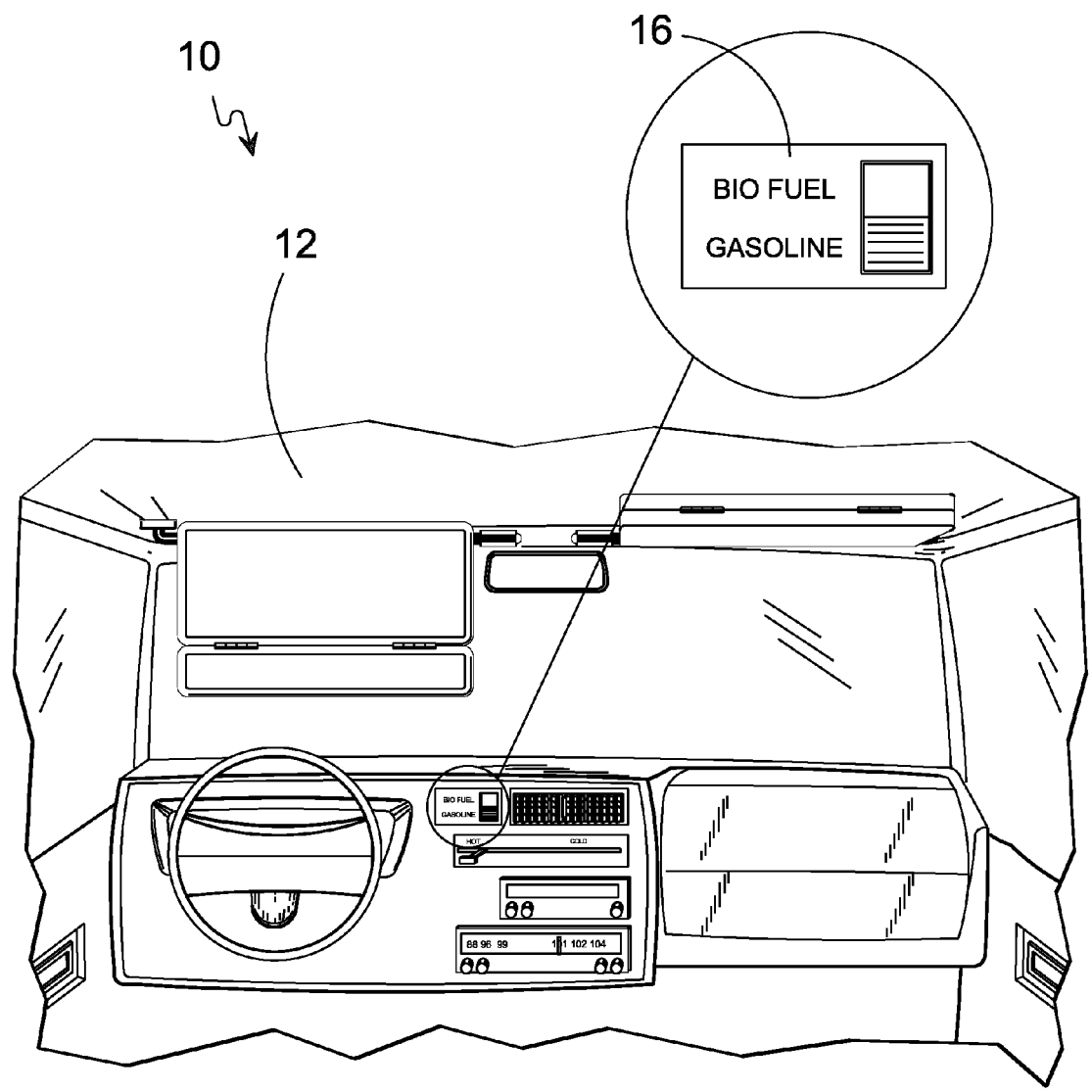
FIG. 2 is an illustrative view of the present invention.

Referring to FIG. 2, shown is an illustrative view of the present invention. Shown is a dashboard having switch 16 of an interior of an automobile 12. The present invention's apparatus and method 10 to optimize ignition timing to accommodate bio diesel/gas blends for use in gasoline engines provides means for the user to map the engine control system to the fuel in the fuel tank. When bio fuel is in use, the user toggles a manual switch to bio fuel, else toggles the switch to gasoline when standard gasoline is present in the gas tank. The manual switch can be fixedly placed upon the dashboard as shown, else any location deemed appropriate for the user and/or vehicle.

Referring to FIG. 3, shown is a block diagram 22 of the present invention's methods of achieving optimal ignition timing. The present invention includes two preferred apparatuses that when used with a dynamometer result in optimal ignition timing to accommodate bio diesel/gas blends for use in gasoline engines. Each apparatuses as used in conjunction and in parallel with the original power train module. Using a laptop the user can modify the ignition timing and fuel delivery based on a two dimension table (x axis being rpm and y axis being load).

Figure 4:
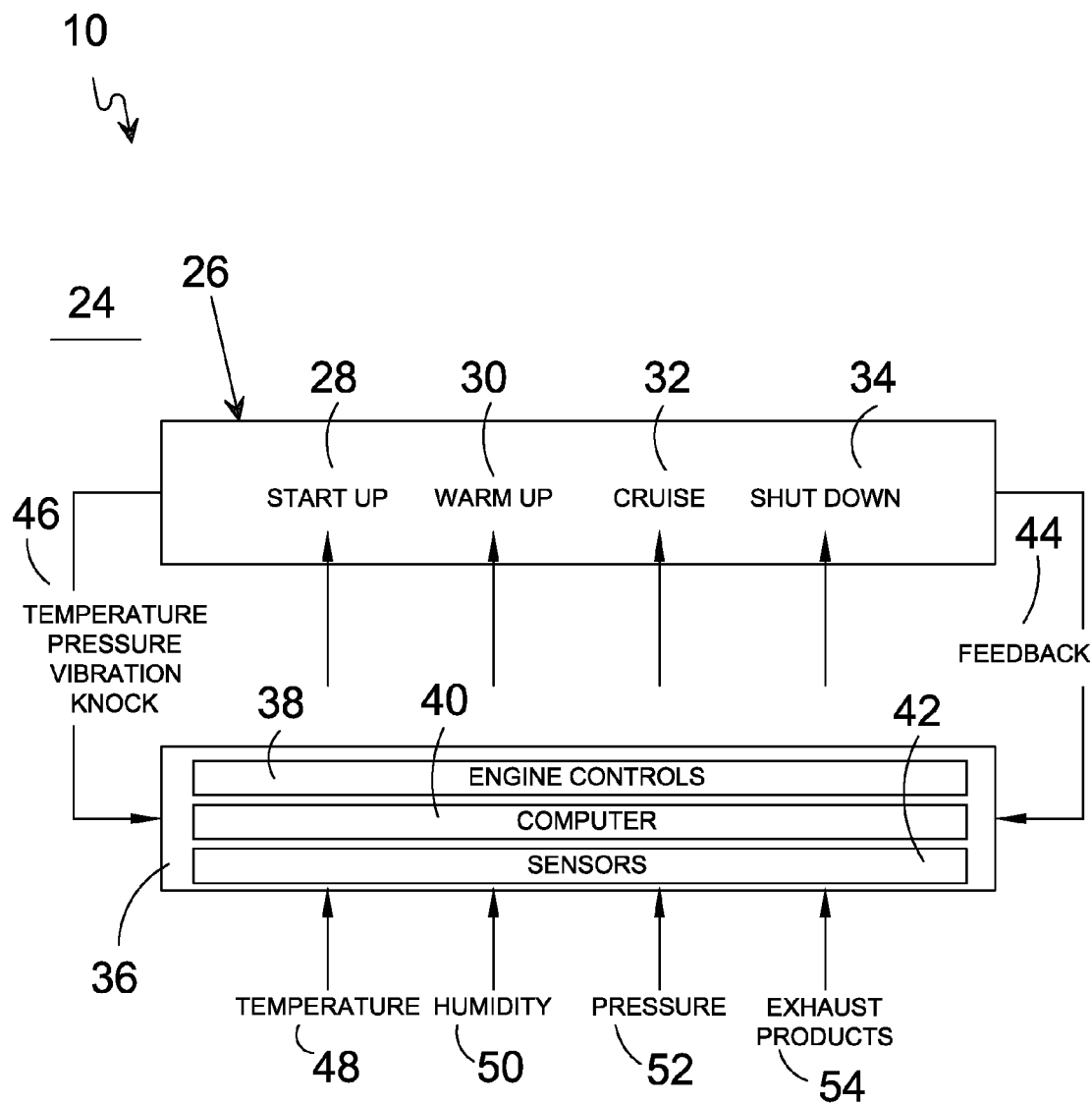
FIG. 4 is an illustrative diagram of the present invention's method of achieving optimal ignition timing utilizing a fuel knock detector

Referring to FIG. 4, shown is an illustrative diagram 24 of the present invention's method of achieving optimal ignition timing utilizing a fuel knock detector 46. The present invention includes two preferred apparatuses that when used with a dynamometer result in optimal ignition timing to accommodate bio diesel/gas blends for use in gasoline engines. Each apparatus is used in conjunction and in parallel with the original power train module. In one preferred method the present invention utilizes a fuel knock detector 46 to optimize the ignition timing to accommodate bio diesel/gas blends for use in gasoline engines. Also shown are temperature 48 humidity 50 pressure 52 and exhaust products sensor 54 generating data used by computer 40 to control engine controls 38 of system 36. Engine states 26 including start up 28, warm up 30, cruise 32, and shut down 34 provide feedback 44 for adjusting the timing of system 36.

Figure 5:
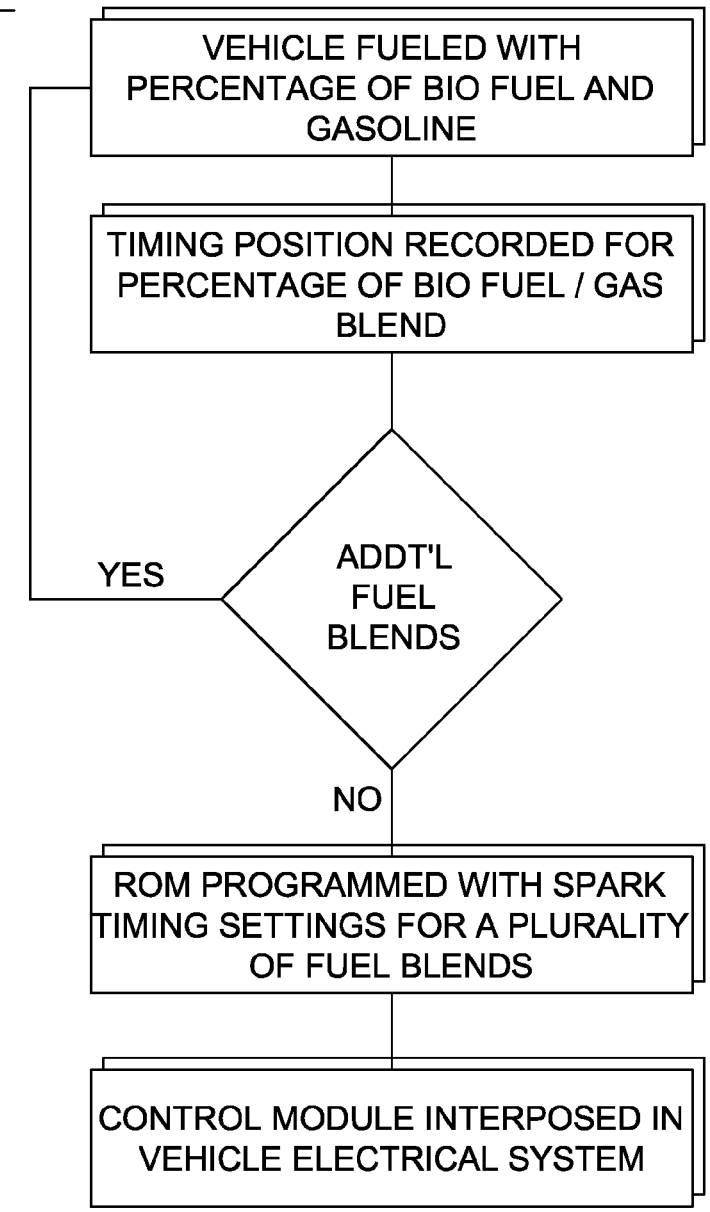
FIG. 5 is a flow chart of the setup operations required for the present invention's system of utilizing biodiesel/gasoline blended fuel.

Referring to FIG. 5, shown is a flow chart 56 of the setup operations required for the present invention's system of utilizing biodiesel/gasoline blended fuel. The present invention's system of utilizing biodiesel/gasoline blended fuel provides means to calibrate the engine fuel timing for a plurality of fuel ratios. Diagnostic equipment is used to identify optimal power output which is in turn recorded and stored into the engine management system interdisposed in the vehicles electrical system.

Figure 6:
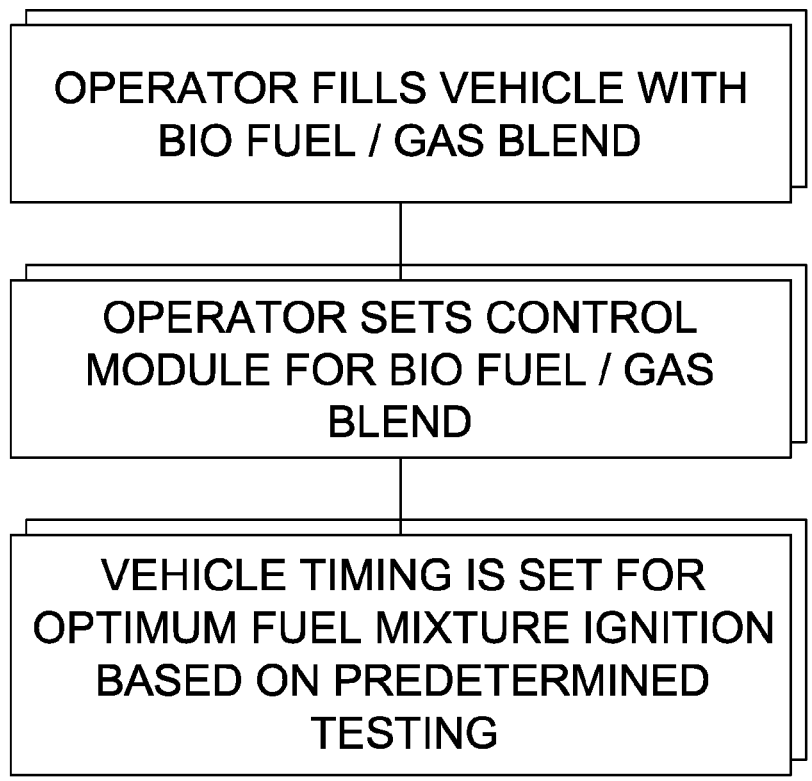
FIG. 6 is a block diagram of the fuel operation's required for the present invention's system of utilizing biodiesel/gasoline blended fuel.

Referring to FIG. 6, shown is a block diagram 58 of the fuel operation's required for the present invention's system of utilizing biodiesel/gasoline blended fuel. The present invention's system of utilizing biodiesel/gasoline blended fuel provides means to adjust the timing setting based on the fuel being dispensed into the gas tank. A manual switch affixed to the vehicle interior allows the user to select the proper setting prior to starting the vehicle after dispensing fuel.

Figure 7:
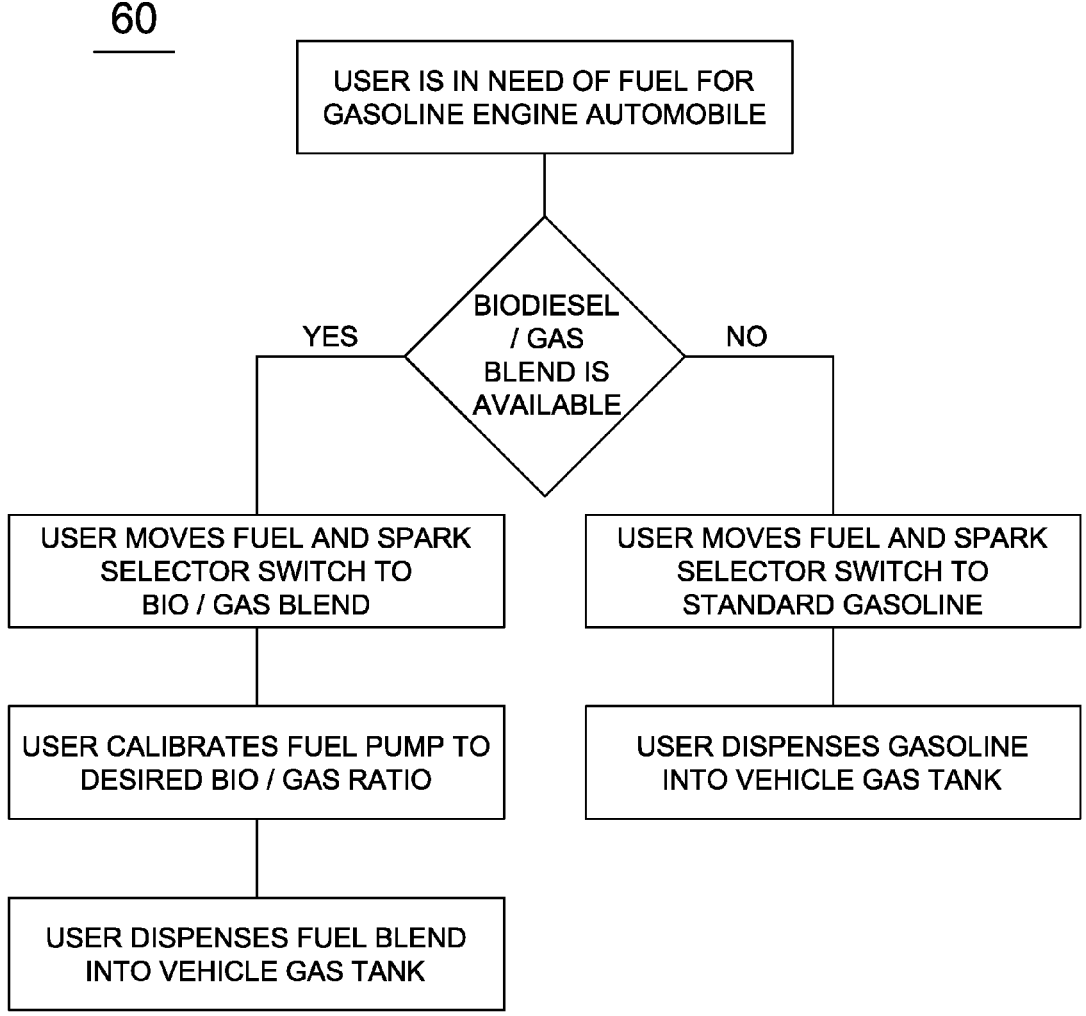
FIG. 7 is a flow chart of the fuel operation's required for the present invention's system of utilizing biodiesel/gasoline blended fuel.

Referring to FIG. 7, shown is a flow chart 60 of the fuel operation's required for the present invention's system of utilizing biodiesel/gasoline blended fuel. The present invention's system of utilizing biodiesel/gasoline blended fuel provides means to adjust the timing setting based on the fuel being dispensed into the gas tank. A manual switch affixed to the vehicle interior allows the user to select the proper setting prior to starting the vehicle after dispensing fuel.

Referring to FIG. 8, shown is a chart of the alternative fuel test log Depicted is an actual test log describing the additional ignition advance with a 10° bio diesel fuel blended with 87 octane gasoline. Additionally shown are observed characteristics.

Referring to FIG. 9, shown is a chart of the alternative fuel test log. Depicted is an actual test log describing the additional ignition advance with a 50° bio diesel fuel blended with 87 octane gasoline. Additionally shown are observed characteristics.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Timing apparatus for controlling ignition spark discharge in combustion engines using a bio-diesel gasoline fuel mixtures comprising:
   (a) a plurality of sensors for generating data from an internal combustion engine having an engine control unit;
   (b) a timing apparatus integrated into the combustion engine for selectively modifying the discharge of the ignition spark when the combustion engine is operating on a fuel mixture containing bio-diesel and gasoline, said timing apparatus in communication with said plurality of sensors and a computer;
   (c) a switch for activating and deactivating the timing apparatuses; and
   (d) the computer in communication with a data storage device, the data storage device having retrievable timing modification values stored thereon, the timing modification values enabling the combustion engine to operate on a fuel mixture containing bio-diesel and gasoline when the timing apparatus is activated.

2. The timing apparatus of claim 1, wherein the plurality of sensors is taken from the group consisting of rpm, load, temperature, humidity, pressure and exhaust-products.

3. The timing apparatus of claim 1, where the data from the plurality of sensors is processed by the computer for determining optimum ignition spark discharge timing for bio-diesel gasoline fuel mixtures stored on the data storage device.

4. The timing apparatus of claim 1, where the timing apparatus is disposed between the engine control unit and an existing ignition spark discharge apparatus.

5. A method of operating a combustion engine on a fuel mixture, the method comprising:
   providing a combustion engine with an engine control unit and an ignition spark discharge apparatus;
   providing a timing apparatus in communication with the ignition discharge apparatus, the timing apparatus having at least one sensor for receiving data from said internal combustion engine, the timing apparatus having a computer and a data storage device, the data storage device having retrievable timing modification values stored thereon, a switch for activating and deactivating the timing apparatus;
   providing a fuel mixture containing bio-diesel and gasoline;
   activating said timing apparatus; and
   running said combustion engine on said fuel mixture where the timing apparatus controls the ignition spark discharge apparatus.

6. The method of claim 5, where the timing apparatus is disposed between the engine control unit and the ignition spark discharge apparatus.

7. The method of claim 5, where the plurality of sensors are taken from the group consisting of temperature, humidity, pressure, and exhaust-products.

8. The method of claim 5, wherein the combustion engine is a gasoline engine.

9. The method of claim 5, where the data from the plurality of sensors is processed by the computer for determining optimum ignition spark discharge timing for bio-diesel gasoline fuel mixtures stored on the data storage device.

* * * * *